United States Patent [19]

Drent et al.

[11] Patent Number: 4,843,145

[45] Date of Patent: Jun. 27, 1989

[54] CATALYTIC POLYMERIZATION OF CO/OLEFIN WITH ORTHO POLAR SUBSTITUTED ARYL BIDENTATE P LIGAND

[75] Inventors: Eit Drent; Petrus W. N. M. Van Leeuwen; Richard L. Wife, all of CM Amsterdam, Netherlands

[73] Assignee: Shell Oil Company, Houston, Tex.

[21] Appl. No.: 89,373

[22] Filed: Aug. 26, 1987

[30] Foreign Application Priority Data

Oct. 6, 1986 [NL] Netherlands ......................... 8602507

[51] Int. Cl.$^4$ ............................................. C08G 67/02
[52] U.S. Cl. ..................................................... 528/392
[58] Field of Search ......................................... 528/392

[56] References Cited

FOREIGN PATENT DOCUMENTS 0121965 10/1984 European Pat. Off. .
76105325 10/1986 Taiwan .

Primary Examiner—Harold D. Anderson
Attorney, Agent, or Firm—Dean F. Vance

[57] ABSTRACT

An improved process for the production of linear alternating polymers of carbon monoxide and at least one ethylenically unsaturated hydrocarbon comprises contacting under polymerization conditions the carbon monoxide and hydrocarbon in the presence of a catalyst composition formed from a compound of certain Group VIII metals, e.g., palladium, an anion of a non-hydrohalogenic acid having a pKa above about 2 but below about 6, and a bidentate ligand of phosphorus wherein at least one of the monovalent phosphorus substituents is aromatic and substituted in a position ortho to the phosphorus with a polar substitutent.

14 Claims, No Drawings

CATALYTIC POLYMERIZATION OF CO/OLEFIN WITH ORTHO POLAR SUBSTITUTED ARYL BIDENTATE P LIGAND

It is known that polymerization of carbon monoxide with one or more ethylenically unsaturated hydrocarbons in the presence of a suitable catalyst results in production of linear alternating polymers known as polyketones. Polymerization of carbon monoxide with at least one ethylenically unsaturated hydrocarbon, e.g., ethylene or mixtures of ethylene and propylene, in the presence of a catalyst formed from a compound of certain Group VIII metals, i.e., a compound of palladium, cobalt or nickel, an anion of a non-hydrohalogenic acid having a pKa less than about 6 and certain bidentate ligands of phosphorus, arsenic or antimony results in the formation of linear alternating polymers having units of the formula

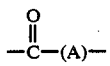

wherein A is the moiety obtained by polymerization of the ethylenically unsaturated hydrocarbon through the ethylenic unsaturation. In the case of such polymerizations of ethylene with carbon monoxide, the polymeric units are of the formula

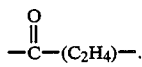

In general, the production of polymer is controlled somewhat by the nature of the anion employed in the catalyst composition. While anions of acids having a pKa less than about 6 are useful in the polymerization process, better results are generally obtained if the anion is the anion of a stronger non-hydrohalogenic acid. Preference is typically given to anions of such acids having a pKa less than about 2 since the catalyst system is typically more active. However, the use in the polymerization system of the components of strong acid could potentially lead to difficulties with materials of construction of the reaction and processing equipment. It would be desirable to modify the catalyst composition so as to permit more efficient use of systems containing anions of weaker acids.

SUMMARY OF THE INVENTION

The present invention relates to an improved process for the production of linear alternating polymers of carbon monoxide and at least one ethylenically unsaturated hydrocarbon. More particularly, the invention relates to an improved process of producing linear alternating polymers of carbon monoxide and at least one ethylenically unsaturated compound in the presence of a catalyst composition formed from a palladium compound, the anion of a non-hydrohalogenic acid having a pKa above 2 but below about 6 and certain bidentate ligands of phosphorus wherein at least one of the monovalent substituents of phosphorus is aromatic and is substituted in a position ortho to the phosphorus with a polar substituent.

DESCRIPTION OF THE INVENTION

The present invention relates to an improved polymerization process for producing linear alternating polyketones using a catalyst composition formed from a palladium compound and an anion of a non-hydrohalogenic acid having a pKa above 2 but below about 6 employed in conjunction with certain bidentate phosphorus ligands having ortho-substituted aromatic substituents under polymerization conditions of temperature and pressure. The particular combination of anion of an acid of specified pKa and ligand of particular structure offers advantages over related catalytic systems.

The non-hydrohalogenic acid from which the anion of the invention is derived is preferably an oxygen-containing acid having a pKa, measured in water at 18° C., above 2 and below about 6. The acid is an inorganic acid such as phosphoric acid, arsenic acid, nitrous acid and selenious acid or is an organic acid including carboxylic acids, monocarboxylic or dicarboxylic, such as tartaric acid, 2,5-dihydroxybenzoic acid, acetoacetic acid, bromoacetic acid, 2-chlorobenzoic acid, α-chlorobutyric acid, α-chloropropionic acid, cyanoacetic acid, chloroacetic acid, glycolic acid, 2-fluorobenzoic acid, o-phthalic acid, 2-furan carboxylic acid, 2-iodobenzoic acid, acetic acid, adipic acid, isobutyric acid, α-phenylbutyric acid, pivalic acid and valeric acid, as well as phenol-type acids such as pentachlorophenol and pentafluorophenol. A preferred class of acids from which the anion catalyst component is derived comprises phosphoric acid, tartaric acid and acetic acid.

The method of providing the anion is not critical. In one modification, the anion is provided in the form of the acid but in alternate modifications the anion is provided as a metal salt. Preferred salts for the provision of the anion are non-noble transition metal salts, i.e., the salts of Groups IB-VIIB of the Periodic Table of Elements such as found in The Handbook of Chemistry and Physics, 50th Ed. Particularly preferred as a non-noble transition metal salt for the anion source is a copper salt.

The palladium compound useful in the catalyst composition is preferably a palladium carboxylate. A variety of palladium carboxylates are suitable, e.g., palladium propionate or palladium octanoate, although largely for reasons of availability palladium acetate is particularly preferred.

In one embodiment of the catalyst composition, the palladium compound and the anion are provided as a single compound such as the aforementioned palladium acetate or other palladium compounds such as palladium tartarate.

In the catalyst compositions of the invention, the anion is provided in a quantity from about 0.5 to about 200 equivalents per gram atom of palladium (as the salt) preferably from about 1 to about 100 equivalents of anion per gram atom of palladium.

The ortho-substituted aromatic bidentate ligand of phosphorus is represented by the formula

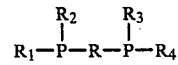

wherein $R_1$, $R_2$, $R_3$ and $R_4$ independently are aryl of from 6 to 20 carbon atoms inclusive, particularly 6 to 10 carbon atoms inclusive and are hydrocarbyl or substituted hydrocarbyl wherein any non-hydrocarbyl substituents are polar substituents, with the proviso that at least one of $R_1$, $R_2$, $R_3$ and $R_4$ is substituted hydrocarbyl having a polar substituent on a carbon atom which is ortho to the phosphorus. Illustrative of suitable polar substituents are the groups R$_5$—O—, R$_5$—S—.

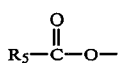

and (R$_5$)$_2$N—, wherein R$_5$ is hydrocarbyl alkyl, preferably lower alkyl of from 1 to 6 carbon atoms. In the above formula, R is a divalent hydrocarbyl bridging group of from 2 to 20 carbon atoms inclusive, preferably from 2 to 4 carbon atoms in the bridge connecting the phosphorus atoms. The preferred R bridging group is the trimethylene group, i.e., the —CH$_2$—CH$_2$—CH$_2$— group.

The groups R$_1$, R$_2$, R$_3$ and R$_4$ are the same or are different so long as at least one of these groups incorporates a polar ortho substituent. Suitable R$_1$, R$_2$, R$_3$ and R$_4$ groups include o-methoxyphenyl, 2,4-di(ethylthio)-phenyl, 2-methoxy-4-dimethylaminophenyl, 2-ethoxyphenyl, 2-propoxyphenyl, 2-acetoxyphenyl and 2-methoxy-1-naphthyl. In preferred modifications, the polar substituents are alkoxy and R$_1$, R$_2$, R$_3$ and R$_4$ are the same. Illustrative of useful bidentate phosphorus ligands are 1,3-bis[di(2-methoxyphenyl)phosphino]propane, 1,3-bis[di(2,4-diethoxyphenyl)phosphino]propane, 1,3-bis[di(2,4,6-trimethoxyphenyl)phosphino]propane and 1,3-bis[di(2-propoxy-5-methoxyphenyl)phosphino]propane. Particularly useful as the ortho-substituted aromatic bidentate phosphorus ligand is 1,3-bis[di(2-methoxyphenyl)phosphino]propane.

In the catalyst compositions, the ligand is employed in an amount from about 0.1 mol to about 3 mol per mol of palladium compound, preferably from about 0.75 mol to 2 mol of ligand per mol of palladium compound.

In some embodiments of the process of the invention it is useful to add a quinone to the catalyst composition to enhance the activity of the catalyst. Suitable quinones are quinones of from 6 to 20 carbon atoms inclusive and include benzoquinones, naphthaquinones and anthraquinones. The use of 1,4-quinones is generally preferred, especially 1,4-benzoquinone. The use of a quinone is optional and amounts of quinone up to about 10,000 mol per gram atom of palladium are employed, particularly an amount up to about 5,000 mol per gram-atom of palladium.

The ethylenically unsaturated hydrocarbons useful as monomers in the process of the invention are hydrocarbons of from 2 to 20 carbon atoms inclusive, preferably from 2 to 10 carbon atoms inclusive. The hydrocarbons are preferably α-olefins and are wholly aliphatic α-olefins such as ethylene, propylene, butene-1, octene-1 and dodecene-1 or contain aryl substituents on a carbon atom of the ethylenic unsaturation, e.g., styrene, p-methylstyrene, p-ethylstyrene and 2,4-dimethylstyrene. The preferred ethylenically unsaturated hydrocarbons for polymerization with carbon monoxide are ethylene or mixtures of ethylene and a second α-olefin, particularly propylene.

In the reaction mixture to be polymerized, the molar ratio of ethylenically unsaturated hydrocarbon to carbon monoxide is from about 10:1 to about 1:5 with molar ratios from about 5:1 to about 1:2 being preferred. In the embodiments where more than one ethylenically unsaturated hydrocarbon is employed in the production of terpolymers, for example the production of terpolymers of ethylene and a second ethylenicaly unsaturated hydrocarbon, the molar ratio of ethylene to second hydrocarbon is from about 400:1 to about 5:1, preferably from about 100:1 to about 10:1.

The quantity of catalyst composition will vary, but amounts of catalyst containing from about $1 \times 10^{-7}$ to about $1 \times 10^{-3}$ gram-atom of palladium per mol of unsaturated hydrocarbon are suitable with amounts of catalyst containing from about $1 \times 10^{-6}$ to about $1 \times 10^{-4}$ gram-atom of palladium per mol of unsaturated hydrocarbon being preferred.

The polymerization reaction is conducted under polymerization conditions. Suitable reaction temperatures are from about 20° C. to about 115° C., particularly from about 30° C. to about 100° C. Typical reaction pressures are from about 1 bar to about 200 bar with pressures from about 20 bar to about 100 bar giving best results.

The reaction is conducted in the liquid phase in the presence of a reaction diluent such as methanol, ethanol or other lower alkanol of up to about 10 carbon atoms. The method of contacting the reactants and catalyst is not critical and may be effected by shaking, stirring or other conventional means. Subsequent to reaction, the product is recovered by conventional methods such as filtering or decantation. The product, on occasion, may contain catalyst residues which may be removed, if desired, by contact with a solvent selective for the catalyst residues.

The process of the invention comprises an improved method of producing known polyketone polymers of known utility. The polyketones are premium thermoplastics and have wide application. For example they are formed into sheets or molded by conventional methods into shaped articles finding application as parts in the auto industry or as containers for food and beverages.

The invention is further illustrated but not limited by the following Comparative Examples (not of the invention) and Illustrative Embodiments. Each of the carbon monoxide/ethylene copolymers' isolated had a melting point of 257° C. and was shown by $^{13}$C-NMR analysis to be of a linear alternating structure of the units

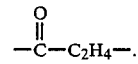

COMPARATIVE EXAMPLE I

To a stirred autoclave of 300 ml capacity was charged a catalyst solution comprising 50 ml of methanol, 0.1 mmol of palladium acetate, 2 mmol of acetic acid (pKa=4.75) and 0.15 mmol of 1,3-bis(diphenylphosphino)propane. After the air in the autoclave was removed by evacuation, ethylene was added until a pressure of 30 bar was reached. Carbon monoxide was then added until a pressure of 60 bar was reached. The contents of the autoclave were maintained at 90° C. for 5 hours, at which time the autoclave was cooled to room temperature and the pressure was released. Only a very small amount of polymer product was obtained.

COMPARATIVE EXAMPLE II

A carbon monoxide/ethylene copolymer was produced by the procedure of Comparative Example I except that the catalyst solution contained phosphoric acid (pKa=2.12) rather than acetic acid and the reaction time was 2.5 hours instead of 5 hours. After release of autoclave pressure, the polymeric product was removed by filtration, washed with methanol and dried in vacuo at room temperature. The amount of copolymer product was 11 g and the calculated polymerization rate was 440 g polymer/g Pd/hr.

COMPARATIVE EXAMPLE III

A carbon monoxide/ethylene polymer was produced by the procedure of Comparative Example II except that the catalyst solution contained tartaric acid (pKa=2.98) instead of phosphoric acid, the reaction temperature was 90° C. instead of 135° C. and the reaction time was 2 hours instead of 2.5 hours. The copolymer product, 9.3 g, was produced at a calculated rate of 465 g polymer/g Pd/hr.

ILLUSTRATIVE EMBODIMENT I

A carbon monoxide/ethylene copolymer was produced according to the procedure of Comparative Example II except that the catalyst solution contained acetic acid in place of the phosphoric acid and 1,3-bis[di(2-methoxyphenyl)phosphino]propane instead of 1,3-bis(diphenylphosphino)propane and the reaction time was 2 hours instead of 2.5 hours. The copolymer product, 7.4 g, was produced at a calculated reaction rate of 370 g of polymer/g Pd/hr.

ILLUSTRATIVE EMBODIMENT II

A carbon monoxide/ethylene copolymer was produced according to the procedure of Comparative Experiment II except that the catalyst solution contained 1,3-bis[di(2-methoxyphenyl)phosphino]propane instead of 1,3-bis(diphenylphosphino)propane and the reaction time was 0.25 hour instead of 2.5 hours. 15.4 G of copolymer product was obtained at a calculated polymerization rate of 6160 g of polymer/g Pd/hr.

ILLUSTRATIVE EMBODIMENT III

A carbon monoxide/ethylene copolymer was produced by the procedure of Comparative Experiment II except that the catalyst solution contained tartaric acid instead of phosphoric acid and 1,3-bis[di(methoxyphenyl)phosphino]propane instead of 1,3-bis(diphenylphosphino)propane and the reaction time was 2 hours instead of 2.5 hours. The polymer product, 7.85 g, was produced at a calculated reaction rate of 785 g of polymer/g Pd/hr.

ILLUSTRATIVE EMBODIMENT IV

If the procedure of Illustrative Embodiment I is followed in the additional presence in the reaction mixture of a minor amount of propylene, a satisfactory yield of a carbon monoxide/ethylene/propylene terpolymer will be obtained.

What is claimed is:

1. In the process of producing linear alternating polymers of carbon monoxide and at least one ethylenically unsaturated hydrocarbon by contacting under polymerization conditions the carbon monoxide and hydrocarbon in the presence of a catalyst formed from a palladium compound, an anion of a non-hydrohalogenic acid and a bidentate phosphorus ligand, the improvement wherein (1) the acid supplying the anion has a pKa from 2 to about 6 and (2) the phosphorus bidentate ligand has at least one substituent directly attached to phosphorus, which substituent is aromatic and is substituted in an ortho position relative to the phosphorus with a polar substituent.

2. The process of claim 1 wherein the bidentate phosphorus ligand is represented by the formula

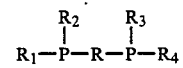

wherein $R_1$, $R_2$, $R_3$ and $R_4$ independently are aromatic of from 6 to 20 carbon atoms inclusive and are hydrocarbyl substituents directly attached to phosphorus or substituted hydrocarbyl substituents directly attached to phosphorus wherein any non-hydrocarbyl substituents of the substituted hydrocarbyl substituents directly attached to phosphorus are polar, and R is a divalent hydrocarbyl bridging group of from 2 to 20 carbon atoms inclusive with from 2 to 4 carbon atoms in the phosphorus-phosphorus bridge.

3. The process of claim 2 wherein R is trimethylene.

4. The process of claim 3 wherein the anion is an anion of an acid selected from phosphoric acid, tartaric acid or acetic acid.

5. The process of claim 4 wherein each of $R_1$, $R_2$, $R_3$ and $R_4$ is phenyl substituted in an ortho position with alkoxy.

6. The process of claim 4 wherein each of $R_1$, $R_2$, $R_3$ and $R_4$ is o-methoxyphenol.

7. The process of claim 4 wherein the hydrocarbon is ethylene or a mixture of ethylene and propylene.

8. The process of claim 7 wherein the hydrocarbon is ethylene.

9. In the process of producing linear alternating polymers of carbon monoxide and ethylene by contacting under polymerization conditions the carbon monoxide and ethylene in the presence of a catalyst formed from a palladium carboxylate, an anion of an oxygen-containing acid and a bidentate phosphorus ligand, the improvement which comprises employing an acid having a pKa from 2 to about 6 and a bidentate phosphorus of the formula

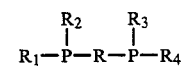

wherein R is trimethylene and each of $R_1$, $R_2$, $R_3$ and $R_4$ is phenyl substituted in an ortho position with alkoxy of up to 6 carbon atoms.

10. The process of claim 9 wherein the anion is an anion of an acid selected from phosphoric acid, tartaric acid or acetic acid.

11. The process of claim 9 wherein each of $R_1$, $R_2$, $R_3$ and $R_4$ is o-methoxyphenyl.

12. The process of claim 10 wherein the acid is phosphoric acid.

13. The process of claim 10 wherein the acid is tartaric acid.

14. The process of claim 10 wherein the acid is acetic acid.

* * * * *